United States Patent [19]

Nagaoka et al.

[11] Patent Number: 5,146,262
[45] Date of Patent: Sep. 8, 1992

[54] AUTO FOCUS CAMERA

[75] Inventors: Shinji Nagaoka; Koji Sato; Michio Kawai, all of Yotsukaido, Japan

[73] Assignee: Seikosha Co. Ltd., Tokyo, Japan

[21] Appl. No.: 392,204

[22] Filed: Aug. 10, 1989

[30] Foreign Application Priority Data

Aug. 10, 1988 [JP] Japan .................. 63-199368

[51] Int. Cl.$^5$ .............................. G03B 13/36
[52] U.S. Cl. ................................... 354/403
[58] Field of Search ................ 354/403; 250/201 AF, 250/201 R, 201.4; 356/1, 4

[56] References Cited

U.S. PATENT DOCUMENTS 4,423,936 1/1984 Johnson ..................... 354/403
4,639,110 1/1987 Rinn et al. ................. 354/403

*Primary Examiner*—W. B. Perkey

[57] ABSTRACT

An auto focus camera produces a distance signal representative of the distance from the camera to an object being photographed. A first storage circuit stores comparative data to be compared with the distance signal, and a comparator circuit compares the distance signal with the comparative data. A second storage circuit stores lens extension amounts corresponding to the comparative data stored in the first storage circuit and outputs a lens extension amount corresponding to the specific comparative data selected by the comparator circuit. A focusing lens is positioned according to the output from the second storage circuit.

2 Claims, 4 Drawing Sheets

AUTO FOCUS CAMERA

BACKGROUND OF THE INVENTION

The present invention relates to an auto focus camera.

In the prior art, auto focus cameras with an optical distance-measuring apparatus having a light-emitting element and a light-receiving element for position detection are well known. For instance, Japanese Patent Laid-Open No. 60511/1985 discloses the following arrangement: An infrared beam of light operated via an infrared light beam source-driving circuit is applied to an object to be photographed via a single projection lens, reflected light thereof is caused to form an image on a PSD (positive sensitive diode) light-receiving element via a single light-receiving lens, and a distance to the object to be measured is calculated by an arithmetic processing circuit on the basis of that image-forming position, thereby automatically adjusting the focal length of a lens.

In addition, Japanese Patent Laid-Open No. 223734/1987 discloses the following arrangement: A plurality of light-emitting elements are juxtaposed, and, as a PSD light-receiving element, one having a large width corresponding to the respective light-emitting elements is used. Respective distances to objects to be measured are calculated by an arithmetic processing circuit to obtain an average value thereof, and the focal length of a photographic lens is automatically adjusted by this average value. With this distance-measuring apparatus, in order to make the width of the PSD light-receiving element as small as possible, one is used in which the plurality of light-emitting elements are juxtaposed perpendicularly to the lengthwise direction of a base line and has a PSD light-receiving element with a width expanded similarly in the perpendicular direction.

In both the first and second prior art arrangement described above, the results of distance measurement are obtained by calculation, so that there is the problem that it takes time in obtaining an in-focus condition. Moreover, if an addition and a subtraction are made with a correction value with respect a distance signal, the calculation becomes even more complicated. In addition, since a special arithmetic control circuit is required for obtaining an average value, the circuit configuration becomes complicated, so that high-speed processing becomes impossible.

Furthermore, in accordance with the above-described first prior art arrangement, if an attempt is made to photograph two object persons standing with an interval longer than a fixed one therebetween, there are cases where a focus zone is located between the two persons, and the background between the two persons is brought into focus, with the result that the objects are photographed in a blurred state, resulting in a so-called passing-through-the-middle phenomenon. In addition, since the closest object is brought into focus, there is a problem in that a remote object becomes out of focus, so that, for instance, it becomes impossible to portray a picture in a "flat" manner at the time of simultaneously shooting a near person and a far scene.

Therefore, to prevent this passing-through-the-middle phenomenon from occurring, there is an arrangement in which a camera is first directed toward one person, and the shutter release button is half pressed when an in-focus state is obtained, and with that state maintained, i.e., by locking the focussing position of the photographic lens, the shutter release button is then pressed after the two object persons are framed in a desired photographic zone. However, such an operation is complicated, and the photographer may make a mistake unless he is familiar with that operation.

Furthermore, in accordance with the above-described second prior art arrangement, a wide chip is required as the light-receiving element, and there is a problem in terms of cost, and, in order to prevent the occurrence of the passing-through-the-middle phenomenon concerning objects juxtaposed laterally, both the light-projecting and light-receiving elements must be arranged vertically, so that there are numerous problems.

SUMMARY OF THE INVENTION

Accordingly, an object of the present invention is to provide a distance-measuring apparatus for a camera which enables its structure to be simplified, and which permits high-speed processing and photographing which meets the intention of the photographer.

To attain the above-described objects, in accordance with the present invention, there is provided an auto focus camera including a light-emitting element for emitting light toward an object, a position detection light-receiving element for receiving light reflected from the object, and an A/D converter for converting the output of the position detection light-receiving element into a distance signal, the lens extension amount being determined on the basis of the distance signal. The auto focus camera has a first storage circuit in which a plurality of comparative data to be compared with the distance signal are stored in advance; a comparator circuit for comparing the distance signal with the comparative data stored in the first storage circuit; a second storage circuit in which a plurality of lens extension amounts corresponding to the comparative data are stored in advance and which is adapted to output a lens extension amount corresponding to a specific comparative data selected by the comparator circuit; and a focussing lens driving device operative on the basis of an output of the second storage circuit.

Furthermore, an auto focus camera in accordance with the present invention has a plurality of light-emitting elements which emit light consecutively; a focussing mode selection circuit in which a plurality of focussing modes are set and one of them can be selected; a lens-extension-amount determining circuit which includes a memory for storing lens extension amounts for respective light-emitting elements from the second storage circuit obtained by consecutively causing the light-emitting elements to emit light and which is adapted to determine a final lens extension amount on the basis of the plurality of lens extension amounts in accordance with the focussing mode selected; and a focussing lens driving device operative on the basis of an output of the lens-extension-amount determining circuit.

In the present invention, a plurality of comparative data to be compared with a distance signal are stored in advance in the first storage circuit, and a plurality of lens extension amounts corresponding to this comparative data are stored in advance in the second storage circuit. Therefore, when the distance to the object is measured by the light-emitting device, a lens extension amount can be output immediately without requiring a calculation.

In addition, lens extension amounts for the respective light-emitting elements from the second storage circuit are stored in the memory of the lens-extension-amount determining circuit. Since a final lens extension amount is determined in accordance with a focussing mode selected and on the basis of the plurality of lens extension amounts, photographing which meets the photographer's intention is possible.

DETAILED DESCRIPTION OF THE INVENTION

Figure 1:
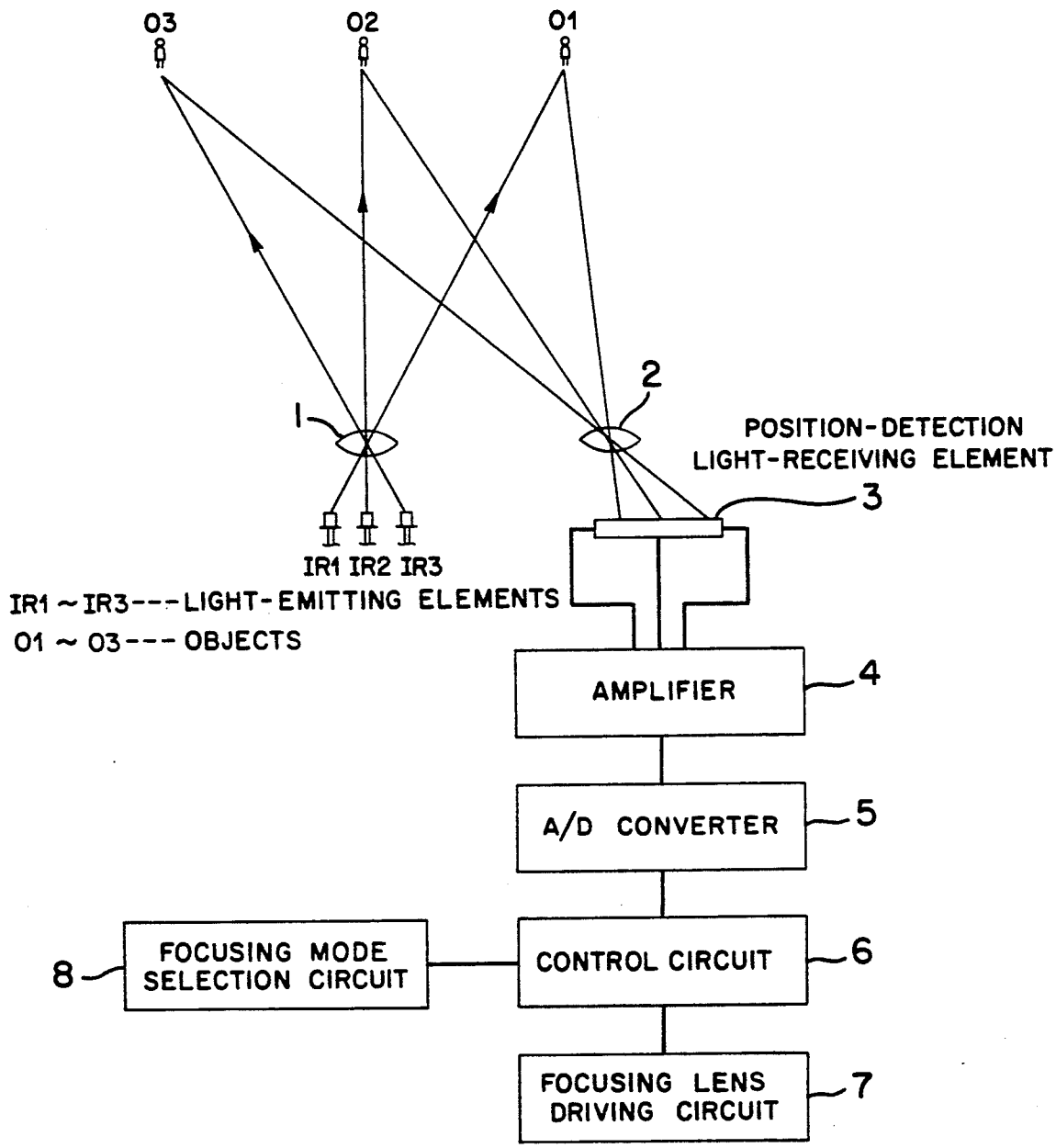
FIG. 1 is a schematic diagram illustrating an embodiment of an auto-focus camera in accordance with the present invention.

Referring now to the drawings, a detailed description will be given of an embodiment of the present invention.

FIG. 1 illustrates an overall schematic diagram, in which infrared LEDs or the like are used as light-emitting elements IR1, IR2, IR3, and the light from the light-emitting elements passes through a projection lens 1 and is applied to objects 01, 02, 03 through respective optical paths. This light is reflected by the objects 01–03, passes through a light-receiving lens 2, and forms an image on a semiconductor position-detection light-receiving element (PSD) 3.

The light received by the PSD 3 is converted into an electric signal, amplified by an amplifier 4, and converted into a numerical value by an A/D converter 5 so as to be converted into a signal representative of a distance. On the basis of this distance signal, the amount of lens extension is determined by a control circuit 6, and a focussing lens-driving device 7 is actuated on the basis of that output.

TABLE

| Comparative Data | Lens Extension Amount | | |
|---|---|---|---|
| | IR 1 | IR 2 | IR 3 |
| 0.7 | 0.8 | | ↑ Close |
| 0.6 | 0.7 | | |
| 0.5 | 0.6 | | |
| 0.4 | 0.5 | | |
| 0.3 | 0.4 | 0.8 | |
| 0.2 | 0.3 | 0.7 | |
| 0.1 | 0.2 | 0.6 | |
| 0.0 | 0.05 | 0.5 | |
| −0.1 | | 0.4 | 0.8 |
| −0.2 | | 0.3 | 0.7 |
| −0.3 | | 0.2 | 0.6 |
| −0.4 | | 0.05 | 0.5 |
| −0.5 | | | 0.4 |
| −0.6 | | | 0.3 |
| −0.7 | | | 0.2 |
| −0.8 | | | 0.05 ↓ Far |

In the data table shown in this table, comparative data corresponds to an output produced by the A/D converter 5 on the basis of distance measurement between the light-emitting elements IR1, IR2, IR3 and the objects 01, 02, 03. In this embodiment, the output of the A/D converter 5 is arranged to be delivered by rounding off at the second decimal place. In addition, the amount of lens extension is a value determined for each light emitting element as to what extent the focussing lens is to be extended in a case where a value corresponding to the comparative data has been obtained on the basis of the above-described distance measurement, and the amount of lens extension becomes larger as the object becomes closer.

Figure 2:
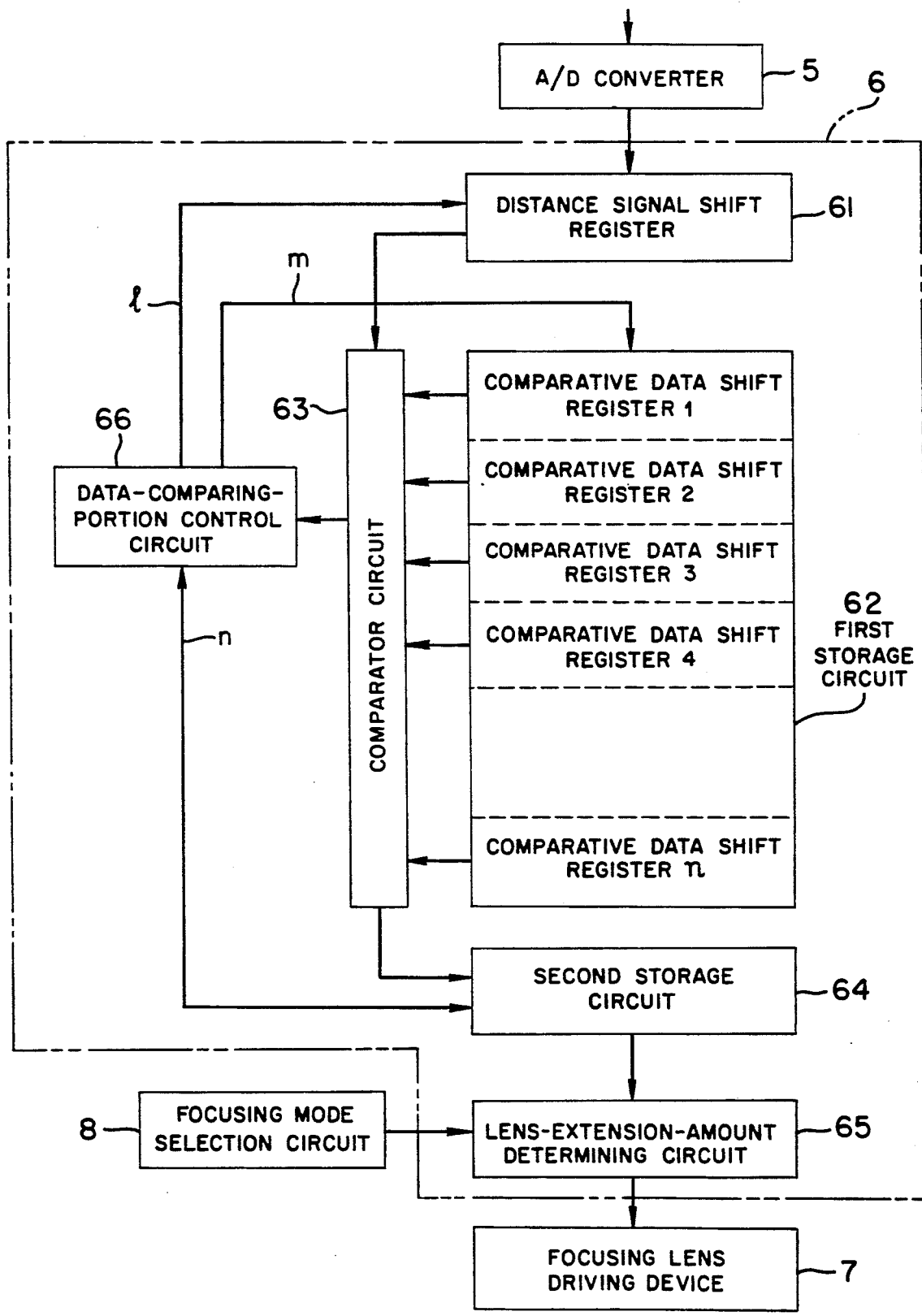
FIG. 2 is a block diagram of a control circuit.

As shown in FIG. 2, the control circuit 6 comprises a distance signal shift register 61 for temporarily storing the distance signal output from the A/D converter 5; a first storage circuit 62 in which comparative data from 0.7 to 0.8 in the data table is stored in advance; a comparator circuit 63 for comparing the distance signal shift register 61 with the first storage circuit 62; a second storage circuit (ROM) 64 in which the amount of lens extension in the data table is stored in advance in correspondence with the comparative data and for each of the light-emitting elements IR1, IR2, IR3, and which is adapted to output an amount of lens extension corresponding to specific comparative data selected by the comparator circuit 63; a lens-extension-amount determining circuit 65 for finally determining the amount of lens extension; and a data-comparing-portion control circuit 66 for controlling the comparing operation in the comparator circuit 63.

As shown in FIGS. 1, 2, a focussing mode selection circuit 8 is connected to the lens-extension-amount determining circuit 65. A plurality of focussing modes are established in this focussing mode selection circuit 8, and one of them can be arbitrarily selected by the photographer. As for the focussing modes, for instance, M1 represents a mode for focussing upon a closest object; M2 represents a mode for focussing upon a farthest object; M3 represents a mode for focussing upon an intermediate distance between the closest object and the farthest object; M4 represents a mode for focussing upon an intermediate distance as an inverse function between the distance to the closest object and the distance to the farthest object; and M5 represents a mode for focussing upon all the objects in interlinking relation with the shutter. The lens-extension-amount determining circuit 65 includes a memory for storing a lens extension amount for each light-emitting element from the second storage circuit 64, which is obtained by causing the light to be emitted consecutively by the light-emitting elements IR1 to IR3, respectively. From this plurality of lens extension amounts, a final lens extension amount is determined in accordance with the mode M1–M5 selected by the focussing mode selection circuit 8 in such a manner as to meet the photographer's intention.

Figure 3:
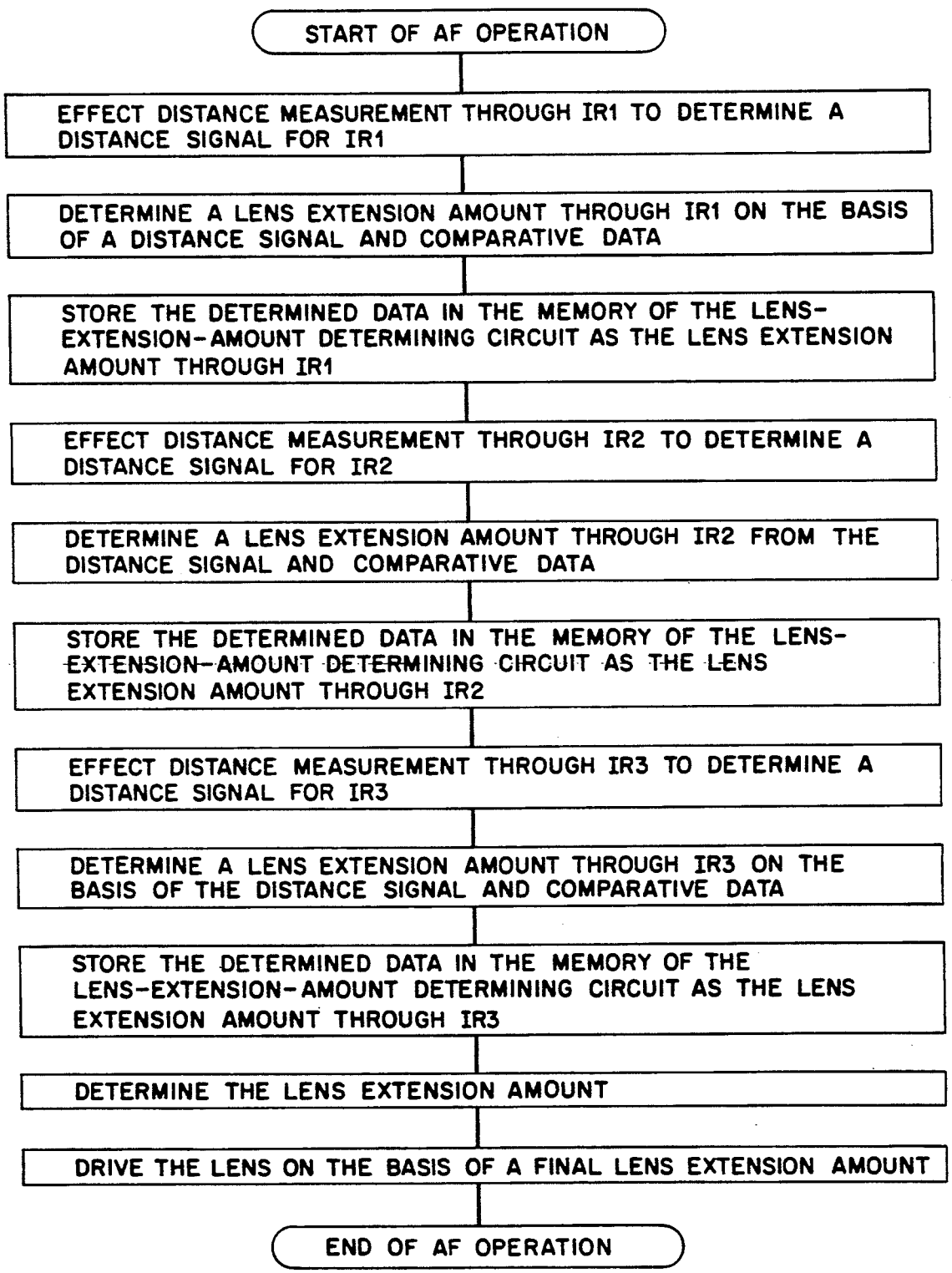
FIGS. 3 and 4 are flowcharts.

Next, a description will be given of the operation of the present invention in accordance with the flowchart shown in FIG. 3, by referring to FIGS. 1 and 2.

First, in FIG. 1, the light-emitting element IR1 is made to emit light to measure the distance to the object 01. Then, as shown in FIG. 2, its distance signal is determined by the A/D converter 5, and this distance signal is stored in the distance signal shift register 61. The data-comparing-portion control circuit 66 provides a command to transfer to the comparator circuit 63 the data in the shift register 61 corresponding to IR1 via a signal line 1, causes the data in the data table corresponding to IR1 to correspond to the first storage circuit 62 via a signal line m, and further specifies an address corresponding to IR1 to the second storage circuit 64 via a signal line n. In this state, the distance signal stored in the distance signal shift register 61 is compared with the comparative data stored in the first storage circuit 62 by means of the comparator circuit 63, and a lens extension amount corresponding to coincident comparative data is output by the second storage circuit. This lens extension amount is stored in the memory of the lens-extension-amount determining circuit 65. Upon completion of this storing operation, the data-comparing-portion control circuit 66 causes the signal lines λ, m, n to correspond to IR2 via the signal line n in the same way as the above-described procedure.

Subsequently, the light-emitting element IR2 is made to emit light to carry out the distance measurement of the object 02 shown in FIG. 1, a lens extension amount is determined in the same way as IR1, and this amount is stored in the memory of the lens-extension-amount determining circuit 65 shown in FIG. 2.

Furthermore, after the signal lines λ, m, n are made to correspond to IR3, the light-emitting element IR3 is made to emit light to carry out the distance measurement of the object 03 shown in FIG. 1, a lens extension amount is determined in the same way as IR1 and IR2, and this amount is stored in the memory of the lens-extension-amount determining circuit 65 shown in FIG. 2.

Figure 4:
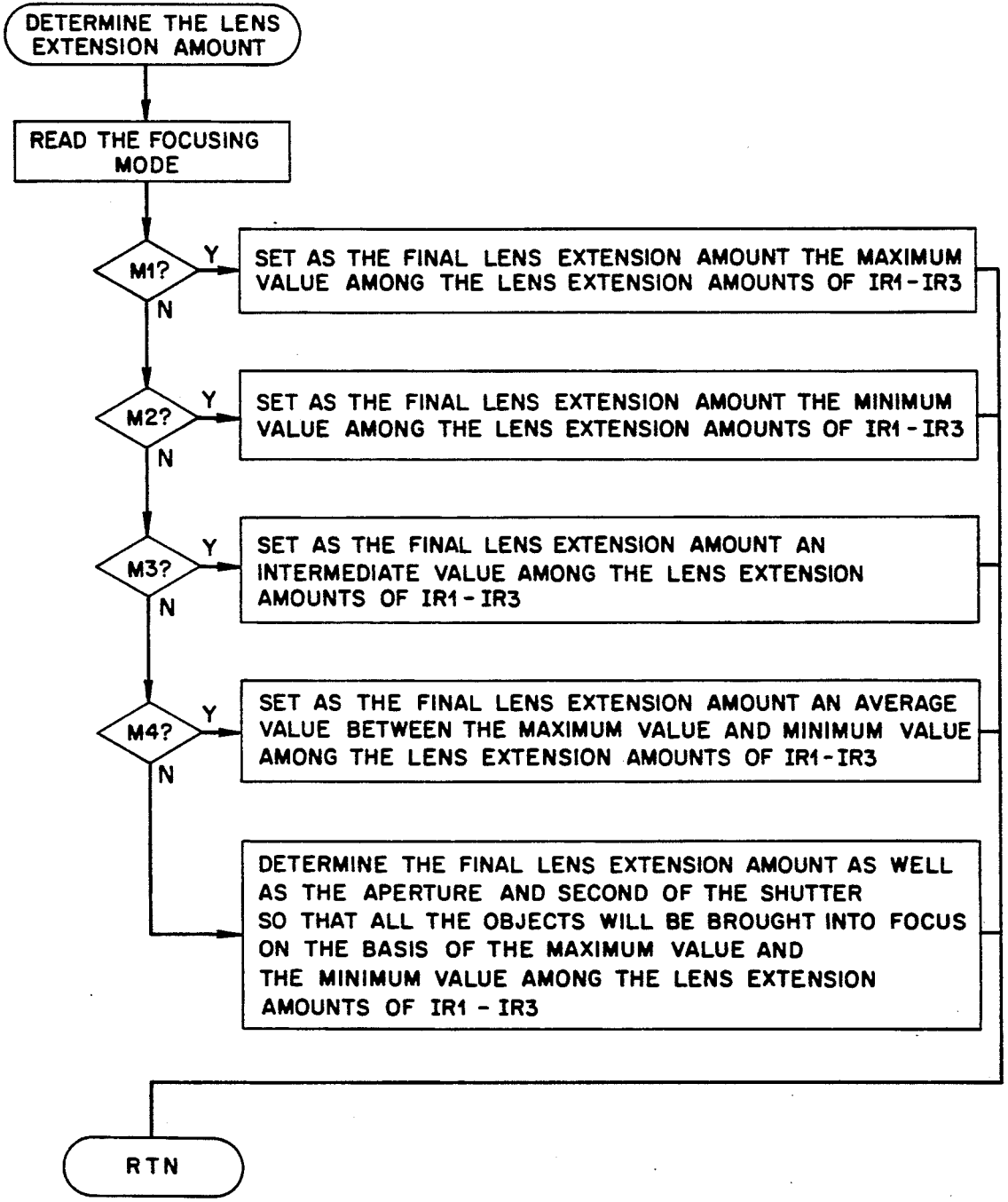

Then, in accordance with the flowchart shown in FIG. 4, control is effected in correspondence with the focussing mode selected by the focussing mode selection circuit 8. In other words, if the mode M1 has been selected, the largest numerical value among the lens extension amounts of IR1-IR3 is set as a final lens extension amount. If the mode M2 has been selected, the smallest numerical value among the lens extension amounts of IR1-IR3 is set as the final lens extension amount. If the mode M3 has been selected, an intermediate numerical value among the lens extension amounts of IR1-IR3 is set as the final lens extension amount. If the mode M4 has been selected, an average value between a maximum value and a minimum value among the lens extension amounts of IR1-IR3 is set as the final lens extension amount. If none of the modes M1-M4 has been selected, the final lens extension amount as well as the aperture and second speed of the shutter are determined so that all the objects will be brought into focus on the basis of the maximum and minimum values among the lens extension amounts of IR1-IR3.

When the final lens extension amount is output from the lens-extension-amount determining circuit 65, the focussing lens driving device 7 is actuated to move the lens to an optimum position, and as the photographer presses the release button, he can effect photographing that meets his intention.

It should be noted that although in the above-described embodiment a description has been given by setting the modes of the focussing mode selection circuit 8 to five kinds, it is possible to provide an arrangement in which a mode for ignoring any one of the signal IR1-IR3 or a mode for placing priority on any one of the signals is selected.

In accordance with the present invention, since the comparative data and lens extension amounts corresponding to this comparative data are stored in advance in the first and second storage circuits, no complicated arithmetic circuit is required, the structure can be simplified, and high-speed processing becomes possible. In addition, it is possible to prevent the passing-through-the-middle phenomenon since the distances to the objects are measured by using a plurality of light-emitting elements, and photographing that meets the photographer's intention becomes possible since the lens extension amount is determined finally by selecting one of a plurality of focussing modes.

We claim:

1. An auto focus camera including a light-emitting element for emitting light toward an object, a position detection light-receiving element for receiving light reflected from said object, and an A/D converter for converting the output of said position detection light-receiving element into a distance signal, wherein a lens extension amount is determined on the basis of said distance signal, said auto focus camera comprising:
    a first storage circuit in which a plurality of comparative data to be compared with said distance signal are stored in advance;
    a comparator circuit for comparing said distance signal with said comparative data stored in said first storage circuit;
    a second storage circuit in which a plurality of lens extension amounts corresponding to said comparative data are stored in advance and which is operative to output a lens extension amount corresponding to a specific comparative data selected by said comparator circuit; and
    a focussing lens driving device operative on the basis of an output of said second storage circuit.

2. An auto focus camera including a plurality of light-emitting elements for consecutively emitting light toward an object, a position detection light-receiving element for receiving light reflected from said object, and an A/D converter for converting the output of said position detection light-receiving element into a distance signal, wherein a lens extension amount is determined on the basis of said distance signal, said auto focus camera comprising:
    a first storage circuit in which a plurality of comparative data to be compared with said distance signal are stored in advance;
    a comparator circuit for comparing said distance signal with comparative data stored in said first storage circuit;
    a second storage circuit in which a plurality of lens extension amounts corresponding to said comparative data are stored in advance and which is operative to output a lens extension amount corresponding to a specific comparative data selected by said comparator circuit;
    a focussing mode selection circuit in which a plurality of focussing modes are set and one of them can be selected;
    a lens-extension-amount determining circuit which includes a memory for storing lens extension amounts for said light-emitting elements from said second storage circuit obtained by consecutively causing said light-emitting elements to emit light and which is operative to determine a final lens extension amount on the basis of said plurality of lens extension amounts in accordance with the focussing mode selected; and
    a focussing lens driving device operative on the basis of an output of said lens-extension-amount determining circuit.

* * * * *